(12) United States Patent
Ernst et al.

(10) Patent No.: US 8,153,745 B2
(45) Date of Patent: *Apr. 10, 2012

(54) MULTI-BRANCHED POLYPROPYLENE

(75) Inventors: Eberhard Ernst, Unterweitersdorf (AT); Manfred Stadlbauer, Linz (AT)

(73) Assignee: Borealis Technology Oy, Porvoo (FI)

( * ) Notice: Subject to any disclaimer, the term of this patent is extended or adjusted under 35 U.S.C. 154(b) by 35 days.

This patent is subject to a terminal disclaimer.

(21) Appl. No.: 12/226,365

(22) PCT Filed: Apr. 16, 2007

(86) PCT No.: PCT/EP2007/003336
§ 371 (c)(1),
(2), (4) Date: Feb. 25, 2009

(87) PCT Pub. No.: WO2007/118698
PCT Pub. Date: Oct. 25, 2007

(65) Prior Publication Data
US 2010/0168364 A1 Jul. 1, 2010

(30) Foreign Application Priority Data
Apr. 18, 2006 (EP) .................................. 06008013

(51) Int. Cl.
*C08F 110/06* (2006.01)
*C08F 210/06* (2006.01)
(52) U.S. Cl. ........ 526/351; 526/348; 526/160; 526/170; 526/130; 526/941; 526/943
(58) Field of Classification Search .............. 526/351, 526/348; 525/240
See application file for complete search history.

(56) References Cited

U.S. PATENT DOCUMENTS

| 3,135,809 A | 6/1964 | Bosmajiano |
| 3,143,584 A | 8/1964 | Walker et al. |
| 3,349,018 A | 10/1967 | Potts et al. |
| 3,415,904 A | 12/1968 | Taniguchi et al. |
| 3,591,656 A | 7/1971 | Kroll |
| 4,156,063 A | 5/1979 | Giannini |
| 4,220,554 A | 9/1980 | Scata et al. |
| 4,226,741 A | 10/1980 | Luciani et al. |
| 4,282,076 A | 8/1981 | Boynton |
| 4,296,022 A | 10/1981 | Hudson |
| 4,298,718 A | 11/1981 | Mayr et al. |
| 4,390,454 A | 6/1983 | Cuffiani et al. |
| 4,495,338 A | 1/1985 | Mayr et al. |
| 4,508,843 A | 4/1985 | Etherton et al. |
| 4,526,941 A | 7/1985 | Sakurai et al. |
| 4,530,913 A | 7/1985 | Pullukat et al. |

(Continued)

FOREIGN PATENT DOCUMENTS
AU 2125492 3/1993
(Continued)

OTHER PUBLICATIONS
International Search Report dated Sep. 7, 2007 for PCT/EP2007/003336.
(Continued)

*Primary Examiner* — Rip A. Lee
(74) *Attorney, Agent, or Firm* — Milbank, Tweed, Hadley & McCloy LLP

(57) ABSTRACT

Multi-branched polypropylene having a g' of less than 1.00.

15 Claims, 4 Drawing Sheets

U.S. PATENT DOCUMENTS

Figure 1:
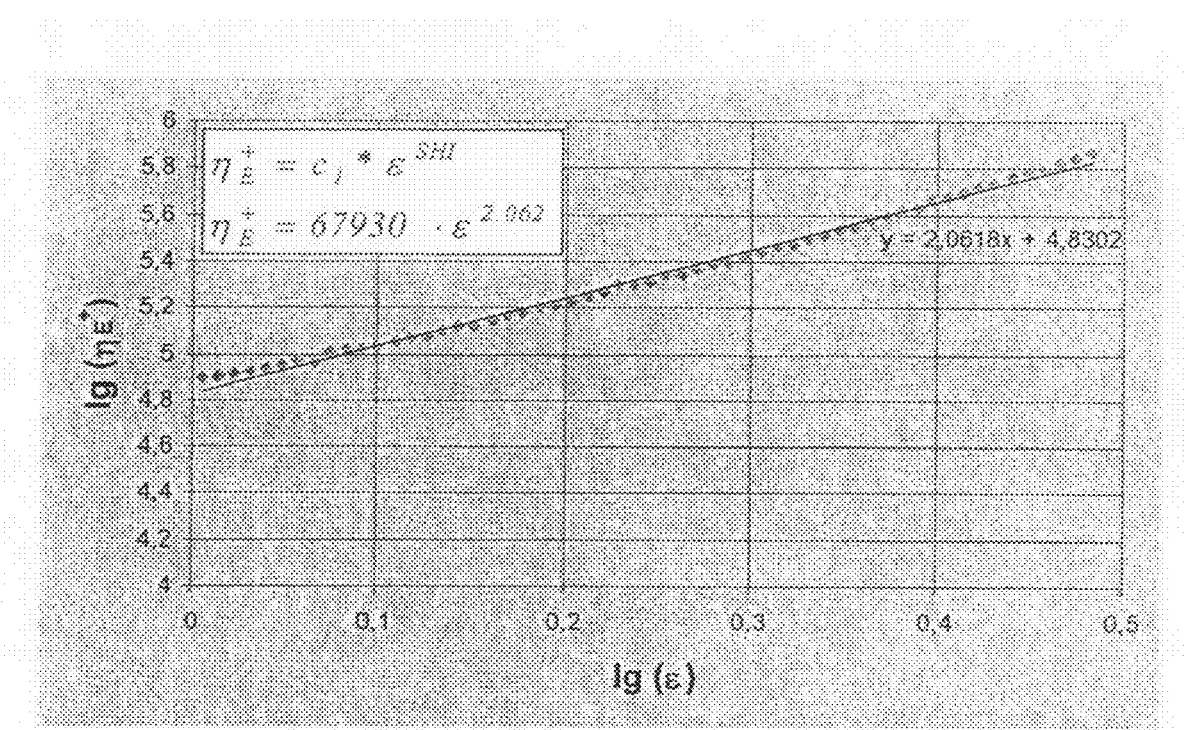

| | | | |
|---|---|---|---|
| 4,530,914 A | 7/1985 | Ewen et al. | |
| 4,542,199 A | 9/1985 | Kaminsky et al. | |
| 4,543,399 A | 9/1985 | Jenkins, III et al. | |
| 4,565,795 A | 1/1986 | Short et al. | |
| 4,578,430 A | 3/1986 | Davison | |
| 4,588,790 A | 5/1986 | Jenkins, III et al. | |
| 4,595,735 A | 6/1986 | Nomura et al. | |
| 4,612,299 A | 9/1986 | Arzoumanidis et al. | |
| 4,626,467 A | 12/1986 | Hostetter | |
| 4,647,550 A | 3/1987 | Kohora et al. | |
| 4,665,208 A | 5/1987 | Welborn, Jr. et al. | |
| 4,668,753 A | 5/1987 | Kashiwa et al. | |
| 4,686,199 A | 8/1987 | Tachikawa et al. | |
| 4,707,524 A | 11/1987 | Ehrig et al. | |
| 4,738,942 A | 4/1988 | Nowlin | |
| 4,743,665 A | 5/1988 | Sasaki et al. | |
| 4,752,597 A | 6/1988 | Turner | |
| 4,769,510 A | 9/1988 | Kaminsky et al. | |
| 4,829,125 A | 5/1989 | Yeo et al. | |
| 4,849,483 A | 7/1989 | Tachikawa et al. | |
| 4,872,880 A | 10/1989 | Boocock | |
| 4,897,452 A | 1/1990 | Berrier et al. | |
| 4,916,198 A | 4/1990 | Scheve et al. | |
| 4,921,825 A | 5/1990 | Kioka et al. | |
| 4,923,833 A | 5/1990 | Kioka et al. | |
| 4,950,631 A | 8/1990 | Buehler et al. | |
| 5,017,714 A | 5/1991 | Welborn | |
| 5,047,446 A | 9/1991 | DeNicola et al. | |
| 5,047,485 A | 9/1991 | DeNicola et al. | |
| 5,098,969 A * | 3/1992 | Buehler et al. | 526/119 |
| 5,103,030 A | 4/1992 | Rohrmann et al. | |
| 5,116,881 A | 5/1992 | Park et al. | |
| 5,145,819 A | 9/1992 | Winter et al. | |
| 5,159,021 A | 10/1992 | Kioka et al. | |
| 5,234,879 A | 8/1993 | Garoff et al. | |
| 5,278,264 A | 1/1994 | Spaleck et al. | |
| 5,296,434 A | 3/1994 | Karl et al. | |
| 5,304,614 A | 4/1994 | Winter et al. | |
| 5,328,969 A | 7/1994 | Winter et al. | |
| 5,329,033 A | 7/1994 | Spaleck et al. | |
| 5,374,752 A | 12/1994 | Winter et al. | |
| 5,414,064 A | 5/1995 | Lux et al. | |
| 5,532,396 A | 7/1996 | Winter et al. | |
| 5,543,535 A | 8/1996 | Lisowsky | |
| 5,561,093 A | 10/1996 | Fujita et al. | |
| 5,565,534 A | 10/1996 | Aulbach et al. | |
| 5,612,462 A | 3/1997 | Lisowsky | |
| 5,616,663 A | 4/1997 | Imuta et al. | |
| 5,629,254 A | 5/1997 | Fukuoka et al. | |
| 5,658,997 A | 8/1997 | Fukuoka et al. | |
| 5,661,096 A | 8/1997 | Winter et al. | |
| 5,689,487 A | 11/1997 | Iwanaga | |
| 5,705,584 A | 1/1998 | Fukuoka et al. | |
| 5,710,229 A | 1/1998 | Garoff et al. | |
| 5,770,753 A * | 6/1998 | Kuber et al. | 556/11 |
| 5,786,432 A | 7/1998 | Kuber et al. | |
| 5,840,644 A | 11/1998 | Kuber et al. | |
| 6,017,841 A | 1/2000 | Winter et al. | |
| 6,051,727 A | 4/2000 | Kuber et al. | |
| 6,121,182 A | 9/2000 | Okumura et al. | |
| 6,124,231 A | 9/2000 | Fritze et al. | |
| 6,147,309 A | 11/2000 | Mottine et al. | |
| 6,172,168 B1 | 1/2001 | Winter et al. | |
| 6,225,432 B1 * | 5/2001 | Weng et al. | 526/351 |
| 6,242,544 B1 | 6/2001 | Kuber et al. | |
| 6,255,506 B1 | 7/2001 | Kuber et al. | |
| 6,255,531 B1 | 7/2001 | Fritz et al. | |
| 6,271,164 B1 | 8/2001 | Fritze et al. | |
| 6,294,496 B1 | 9/2001 | Diefenbach | |
| 6,329,313 B1 | 12/2001 | Fritze et al. | |
| 6,350,829 B1 | 2/2002 | Lynch et al. | |
| 6,365,689 B1 | 4/2002 | Ushioda et al. | |
| 6,417,302 B1 | 7/2002 | Bohnen | |
| 6,444,606 B1 | 9/2002 | Bingel et al. | |
| 6,469,114 B1 | 10/2002 | Schottek et al. | |
| 6,482,895 B2 | 11/2002 | Maugans et al. | |
| 6,482,902 B1 | 11/2002 | Bohnen et al. | |
| 6,492,539 B1 | 12/2002 | Bingel et al. | |
| 6,503,993 B1 * | 1/2003 | Huovinen et al. | 526/348.1 |
| 6,509,324 B1 | 1/2003 | Franzini et al. | |
| 6,583,238 B1 | 6/2003 | Gres et al. | |
| 6,924,248 B2 | 8/2005 | Mihan et al. | |
| 7,094,727 B2 | 8/2006 | Hwang et al. | |
| 7,235,618 B2 | 6/2007 | Lin et al. | |
| 7,341,971 B2 | 3/2008 | Denifl et al. | |
| 7,342,078 B2 | 3/2008 | Schottek et al. | |
| 2002/0173602 A1 | 11/2002 | Appleyard et al. | |
| 2004/0010087 A1 | 1/2004 | Obata et al. | |
| 2004/0072005 A1 | 4/2004 | German et al. | |
| 2005/0054518 A1 | 3/2005 | Denifl et al. | |
| 2005/0090571 A1 | 4/2005 | Mehta et al. | |
| 2008/0058437 A1 | 3/2008 | Burgun et al. | |
| 2009/0062494 A1 | 3/2009 | Stadlbauer et al. | |
| 2009/0131611 A1 | 5/2009 | Stadlbauer et al. | |
| 2009/0149614 A1 | 6/2009 | Loyens et al. | |
| 2009/0169907 A1 | 7/2009 | Stadlbauer et al. | |
| 2009/0312178 A1 | 12/2009 | Ernst et al. | |

FOREIGN PATENT DOCUMENTS

| | | |
|---|---|---|
| CA | 2055216 | 5/1992 |
| CA | 2055218 | 5/1992 |
| CA | 1317411 | 5/1993 |
| CA | 2241812 | 4/1997 |
| CH | 617216 | 5/1980 |
| DE | 3415063 | 11/1985 |
| DE | 19813657 | 9/1990 |
| DE | 19606167 | 8/1997 |
| DE | 19622207 | 12/1997 |
| DE | 19804970 | 8/1999 |
| EP | 0063654 | 11/1982 |
| EP | 0129368 | 12/1984 |
| EP | 0151883 | 8/1985 |
| EP | 0152701 | 8/1985 |
| EP | 0159802 | 10/1985 |
| EP | 0190889 | 8/1986 |
| EP | 0206172 | 12/1986 |
| EP | 0277003 | 8/1988 |
| EP | 0277004 | 8/1988 |
| EP | 0279863 | 8/1988 |
| EP | 0302424 | 2/1989 |
| EP | 0320762 | 6/1989 |
| EP | 0354893 | 2/1990 |
| EP | 0368577 | 5/1990 |
| EP | 0384431 | 8/1990 |
| EP | 0416815 | 3/1991 |
| EP | 0417319 | 3/1991 |
| EP | 0423101 | 4/1991 |
| EP | 0442725 | 8/1991 |
| EP | 0518455 | 12/1992 |
| EP | 0529908 | 3/1993 |
| EP | 0537686 | 4/1993 |
| EP | 0586109 | 3/1994 |
| EP | 0607703 | 7/1994 |
| EP | 0625545 | 11/1994 |
| EP | 0627449 | 12/1994 |
| EP | 0674325 | 9/1995 |
| EP | 0678527 | 10/1995 |
| EP | 0690458 | 1/1996 |
| EP | 0712869 | 5/1996 |
| EP | 0718324 | 6/1996 |
| EP | 0754731 | 1/1997 |
| EP | 0834519 | 4/1998 |
| EP | 0879830 | 11/1998 |
| EP | 0885918 | 12/1998 |
| EP | 0887379 | 12/1998 |
| EP | 0893802 | 1/1999 |
| EP | 0947551 | 10/1999 |
| EP | 1090068 | 10/2000 |
| EP | 1295910 | 3/2003 |
| EP | 1367068 | 12/2003 |
| EP | 1429346 | 6/2004 |
| EP | 1484345 | 12/2004 |
| EP | 1726602 | 11/2006 |
| EP | 1726603 | 11/2006 |
| EP | 1847555 | 10/2007 |
| GB | 819147 | 8/1959 |
| GB | 992388 | 5/1965 |

| | | |
|---|---|---|
| GB | 2184448 | 6/1987 |
| JP | 1983162607 | 3/1985 |
| JP | 62124105 | 6/1987 |
| JP | 11349606 | 12/1999 |
| JP | 2002363356 | 12/2002 |
| JP | 2003147110 | 5/2003 |
| JP | 2001011112 | 1/2006 |
| WO | 9212182 | 7/1992 |
| WO | 9219653 | 11/1992 |
| WO | 9219658 | 11/1992 |
| WO | 9407930 | 4/1994 |
| WO | 9426794 | 11/1994 |
| WO | 9428034 | 12/1994 |
| WO | 9512622 | 5/1995 |
| WO | 9530708 | 11/1995 |
| WO | 9702276 | 1/1997 |
| WO | 9711775 | 4/1997 |
| WO | 9722633 | 6/1997 |
| WO | 9812234 | 3/1998 |
| WO | 9840331 | 9/1998 |
| WO | 9840416 | 9/1998 |
| WO | 9849208 | 11/1998 |
| WO | 9909096 | 2/1999 |
| WO | 9919335 | 4/1999 |
| WO | 9924478 | 5/1999 |
| WO | 0012572 | 3/2000 |
| WO | 0044799 | 8/2000 |
| WO | 0063287 | 10/2000 |
| WO | 0068315 | 11/2000 |
| WO | 0073369 | 12/2000 |
| WO | 2001025926 | 4/2001 |
| WO | 0146274 | 6/2001 |
| WO | 0148034 | 7/2001 |
| WO | 0196418 | 12/2001 |
| WO | 0198409 | 12/2001 |
| WO | 02090400 | 11/2002 |
| WO | 03040233 | 5/2003 |
| WO | 03/051934 | 6/2003 |
| WO | 03051934 | 6/2003 |
| WO | 2004101673 | 11/2004 |
| WO | 2005030811 | 4/2005 |
| WO | 2006/118890 | 9/2006 |

OTHER PUBLICATIONS

International Preliminary Report on Patentability dated Apr. 3, 2008.
Written Opinion for PCT/EP2007/003336.
Scollard, et al, "Sterically Demanding Diamide Ligands: Synthesis of Structure of d° Zirconium Alkyl Derivatives, Organometallics", v. 14, pp. 5478-5480, (1995).

Chujo et al., "Two-site model analysis of 13C n.m.r. of polypropylene polymerized by Ziegler-Natta catalyst with external alkoxysilane donors", Polymer, 1994, vol. 35, No. 2, pp. 339-342.
Farber, M., "Latest Developments in Polypropylene", Jul. 1966 American Dyestuff Reporter—pp. 26, 27, 30 & 31.
Lin, et al., "The Effect of Pigments an the Development of Structure and Properties of Polypropylene Filaments" pp. 1950-1953.
Marans et al., "Film Lamination by Radiation-Induced Polymerization of Acrylic Acid", Journal of Applied Polymer Science, vol. 9, 1965, pp. 3661-3680.
Wild, "Temperature Rising Elution Fractionation" Advances in Polymer Science vol. 98 (1990) pp. 1-47.
Ewen et al., "Expanding the Sope of Metallocene Catalysis: Beyong Indenyl and Furenyl Derivatives" Metalorganic Catalysts for Synthesis and polymerization (1999), pp. 1150-1169.
Pasynkiewicz, S., "Alumoxanes: Synthesis, Structures, Complexes and Reactions". Polyhedron 9(2/3), 429-453 (1990).
Hayashi et al., "Heptad configurational analysis of C n.m.r. spectra in highly isotactic polypropylene", Polymer vol. 29, 1988, pp. 138-143.
Mayne, Dr. N, "The Latest Developments in Polypropylene", Plastics Southern Africa, Jun. 1982, pp. 35, 38, 40, 42, 51, and 52.
Makio et al., "Heterogeneous catalysts for olefin polymerization Heterogeneous catalysts for olefin polymerization", XP002398515 retrieved from STN Datase accession No. 2001:40113, JP 2001-01112 A2 Jun. 30, 1996.
Makio et al., "Manufacture of low-crystalline or amorphous olefin polymers with narrow molecular weight distribution Manufacture of low-crystalline or amorphous olefin polymers with narrow molecular weight distribution", XP002398516 retrieved from STN Database accession No. 1999:801618, JP 1349606 A2 Jun. 10, 1998.
Zimm et al., "The Dimensions of Chain Molecules Containing Branches and Rings", J. Chem. Phys. vol. 17, 1949, pp. 1301-1314.
Ver Strate, G., Encyclopedia of Polymer Science and Engineering—Ethylene-Propylene Elastomers, 2nd ed., vol. 6, 1986, pp. 544-559.
Ewen et al., "Crystal Structures and Stereospecific Propylene Polymerizations with Chiral Hafnium Metallocene Catalysts", J. Am. Chem. Soc. (1987), vol. 109, pp. 6544-6545.
BS EN ISO, "Plastics—Determination of viscosity number and limiting viscosity—Part 3: Polyethylenes and polypropylenes", vol. 1628, Oct. 1999.
Mitsuishi, K., "Propylene (Nucleating Agents)", vol. 9, 1996 pp. 6602-6608.
Kaminsky et al., "Polymerization of Propene and Butene with a Chiral Zirconocene and Methylalumoxane as Cocatalyst", (1985) Angew. Chem. Int'l Ed., Engl. 24, 507-8.

* cited by examiner

Figure 1: Determination of the SHI of "A" at a strain rate of $0.1\ s^{-1}$ (SHI@$0.1s^{-1}$ is determined to be 2.05)

MULTI-BRANCHED POLYPROPYLENE

This application is based on International Application PCT/EP2007/003336 filed Apr. 16, 2007, which claims priority to European Patent Application No. 06008013.2 filed on Apr. 18, 2006, the disclosures of which are herein incorporated by reference in their entireties.

The present invention relates to a new class of polypropylenes.

Well-known polypropylenes of commerce are particularly isotactic, semi-crystalline, thermoplastic polymer mixtures. Although the polypropylenes of commerce have many desirable and beneficial properties, they also possess some important drawbacks such as low melt strength making them unsuitable for many applications, such as for blown films, extrusion coating, foam extrusion and blow-molding. These shortcomings have partially been overcome by introduction of branchings in the linear polymer backbone. This can be achieved through post-reactor treatment, copolymerization with dienes, and through polymerization with specific catalysts at high temperatures. Although these branched polymer types have improved properties, they still do not have a high stability of their melt in the extrusion processes under extensional flow.

To overcome this drawback and to develop a polypropylene which is suitable for advanced polypropylene applications, there is still the desire to improve the characteristics of known polypropylene.

The finding of the present invention is to provide a polypropylene being multi-branched, i.e. not only the polypropylene backbone is furnished with a larger number of side chains (branched polypropylene) but also some of the side chains themselves are provided with further side chains.

Hence, the present invention is related to a polypropylene showing a strain rate thickening which means that the strain hardening increases with extension rates.

Hence the polypropylene according to this invention has a multi-branching index (MBI) of at least 0.15, more preferably of at least 0.20, and still more preferred of at least 0.30, wherein the multi-branching index (MBI) is defined as the slope of strain hardening index (SHI) as function of the logarithm to the basis 10 of the Hencky strain rate (lg (dε/dt)), wherein dε/dt is the deformation rate, ε is the Hencky strain, and the strain hardening index (SHI) is measured at 180° C., wherein the strain hardening index (SHI) is defined as the slope of the logarithm to the basis 10 of the tensile stress growth function ($lg(\eta_E^+)$) as function of the logarithm to the basis 10 of the Hencky strain ($lg(\epsilon)$) in the range of Hencky strains between 1 and 3.

A strain hardening index (SHI) can be determined at different strain rates. A strain hardening index (SHI) is defined as the slope of the logarithm to the basis 10 of the tensile stress growth function $\eta_E^+$ as function of the logarithm to the basis 10 of the Hencky strain ε between Hencky strains 1.00 and 3.00 at a at a temperature of 180 °C., where a SHI@ 0.1 s$^{-1}$ is determined with a deformation rate $\dot{\epsilon}_H$ of 0.10 s$^{-1}$, a SHI@0.3 s$^{-1}$ is determined with a deformation rate $\dot{\epsilon}_H$ of 0.30 s$^{-1}$, a SHI@3 s$^{-1}$ is determined with a deformation rate $\dot{\epsilon}_H$ of 3.00 s$^{-1}$, and a SHI@10 s$^{-1}$ is determined with a deformation rate $\dot{\epsilon}_H$ of 10.0 s$^{-1}$. In comparing the strain hardening index (SHI) at those five strain rates $\dot{\epsilon}_H$ of 0.10, 0.30, 1.00, 3.00 and 10.0 s$^{-1}$, the slope of the strain hardening index (SHI) as function of the logarithm to the basis 10 of $\dot{\epsilon}_H$, $lg(\dot{\epsilon}_H)$ is a characteristic measure for multi-branching. Therefore, a multi-branching index (MBI) is defined as the slope of SHI as a function of $lg(\dot{\epsilon}_H)$, i.e. the slope of a linear fitting curve of the strain hardening index (SHI) versus $lg(\dot{\epsilon}_H)$ applying the least square method, preferably the strain hardening index (SHI) is defined at deformation rates $\dot{\epsilon}_H$ between 0.05 s$^{-1}$ and 20.00 s$^{-1}$, more preferably between 0.10 s$^{-1}$ and 10.0 s$^{-1}$, still more preferably at the deformations rates 0.10, 0.30, 1.00, 3.00 and 10.0 s$^{-1}$. Yet more preferably the SHI-values determined by the deformations rates 0.10, 0.30, 1.00, 3.00 and 10.0 s$^{-1}$ are used for the linear fit according to the least square method when establishing the multi-branching index (MBI).

Surprisingly, it has been found that polypropylenes with such characteristics have superior properties compared to the polypropylenes known in the art. Especially, the melt of the polypropylenes in the extrusion process has a high stability.

The new polypropylenes are characterized in particular by extensional melt flow properties. The extensional flow, or deformation that involves the stretching of a viscous material, is the dominant type of deformation in converging and squeezing flows that occur in typical polymer processing operations. Extensional melt flow measurements are particularly useful in polymer characterization because they are very sensitive to the molecular structure of the polymeric system being tested. When the true strain rate of extension, also referred to as the Hencky strain rate, is constant, simple extension is said to be a "strong flow" in the sense that it can generate a much higher degree of molecular orientation and stretching than flows in simple shear. As a consequence, extensional flows are very sensitive to crystallinity and macro-structural effects, such as long-chain branching, and as such can be far more descriptive with regard to polymer characterization than other types of bulk rheological measurement which apply shear flow.

Accordingly, the polypropylenes of the present invention, i.e. multi-branched polypropylenes, are characterized by the fact that their strain hardening index (SHI) increases with the deformation rate $\dot{\epsilon}_H$, i.e. a phenomenon which is not observed in other polypropylenes. Single branched polymer types (so called Y polymers having a backbone with a single long side-chain and an architecture which resembles a "Y") or H-branched polymer types (two polymer chains coupled with a bridging group and a architecture which resemble an "H") as well as linear or short chain branched polymers do not show such a relationship, i.e. the strain hardening index (SHI) is not influenced by the deformation rate (see FIGS. 2 and 3). Accordingly, the strain hardening index (SHI) of known polymers, in particular known polypropylene and polyethylenes, does not increase or increases only negligible with increase of the deformation rate (dε/dt). Industrial conversion processes which imply elongational flow operate at very fast extension rates. Hence the advantage of a material which shows more pronounced strain hardening (measured by the strain hardening index (SHI)) at high strain rates becomes obvious. The faster the material is stretched, the higher the strain hardening index (SHI) and hence the more stable the material will be in conversion. Especially in the fast extrusion process, the melt of the multi-branched polypropylenes has a high stability.

Furthermore it is preferred that the inventive polypropylene has a strain hardening index (SHI@1 s$^{-1}$) of at least 0.30, more preferred of at least 0.40, still more preferred of at least 0.50.

The strain hardening index (SHI) is a measure for the strain hardening behavior of the polypropylene melt. In the present invention, the strain hardening index (SHI@1 s$^{-1}$) has been measured by a deformation rate (dε/dt) of 1.00 s$^{-1}$ at a temperature of 180° C. for determining the strain hardening behavior, wherein the strain hardening index (SHI) is defined as the slope of the tensile stress growth function $\eta_E^+$ as a function of the Hencky strain $\epsilon$ on a logarithmic scale between 1.00 and 3.00 (see FIG. 1).

Thereby the Hencky strain $\epsilon$ is defined by the formula $\epsilon=\dot{\epsilon}_H \cdot t$, wherein the Hencky strain rate $\dot{\epsilon}_H$ is defined by the formula $$\dot{\varepsilon} = \frac{2 \cdot \Omega \cdot R}{L_0} [s^{-1}] \text{ with}$$

"$L_0$" is the fixed, unsupported length of the specimen sample being stretched which is equal to the centerline distance between the master and slave drums "R" is the radius of the equi-dimensional windup drums, and "$\Omega$" is a constant drive shaft rotation rate.

In turn the tensile stress growth function $\eta_E^+$ is defined by the formula $$\eta_E^+(\varepsilon) = \frac{F(\varepsilon)}{\dot{\varepsilon} \cdot A(\varepsilon)} \text{ with}$$

$$T(\varepsilon) = 2 \cdot R \cdot F(\varepsilon) \text{ and}$$

$$A(\varepsilon) = A_0 \cdot \left(\frac{d_S}{d_M}\right)^{2/3} \cdot \exp(-\varepsilon) \text{ wherein}$$

the Hencky strain rate $\dot{\epsilon}_H$ is defined as for the Hencky strain $\epsilon$
"F" is the tangential stretching force
"R" is the radius of the equi-dimensional windup drums
"T" is the measured torque signal, related to the tangential stretching force"FH
"A" is the instantaneous cross-sectional area of a stretched molten specimen
"$A_0$" is the cross-sectional area of the specimen in the solid state (i.e. prior to melting),
"$d_s$" is the solid state density and
"$d_M$," the melt density of the polymer.

In addition, it is preferred that the branching index g' of the inventive polypropylene shall be less than 1.00, more preferably less than 0.90, still more preferably less than 0.80. In the preferred embodiment, the branching index g' shall be less than 0.70. The branching index g' defines the degree of branching and correlates with the amount of branches of a polymer. The branching index g' is defined as g'=$[IV]_{br}/[IV]_{lin}$ in which g' is the branching index, $[IV]_{br}$ is the intrinsic viscosity of the branched polypropylene and $[IV]_{lin}$ is the intrinsic viscosity of the linear polypropylene having the same weight average molecular weight (within a range of ±10%) as the branched polypropylene. Thereby, a low g'-value is an indicator for a high branched polymer. In other words, if the g'-value decreases, the branching of the polypropylene increases. Reference is made in this context to B. H. Zimm and W. H. Stockmeyer, J. Chem. Phys. 17, 1301 (1949). This document is herewith included by reference.

The intrinsic viscosity needed for determining the branching index g' is measured according to DIN ISO 1628/1, October 1999 (in Decalin at 135° C.).

For further information concerning the measuring methods applied to obtain the relevant data for the a multibranching index (MBI), the tensile stress growth function $\eta E^+$, the Hencky strain rate $\dot{\epsilon}_H$, the Hencky strain $\epsilon$ and the branching index g', it is referred to the example section.

It is in particular preferred that the polypropylene according to this invention has branching index g' of less than 1.00, a strain hardening index (SHI@1 s$^{-1}$) of at least 0.30 and multi-branching index (MBI) of at least 0.15. Still more preferred the polypropylene according to this invention has branching index g' of less than 0.80, a strain hardening index (SHI@1 s$^{-1}$) of at least 0.40 and multi-branching index (MBI) of at least 0.15. In another preferred embodiment the polypropylene according to this invention has branching index g' of less than 1.00, a strain hardening index (SHI@1 s$^{-1}$) of at least 0.30 and multi-branching index (MBI) of at least 0.20. In still another preferred embodiment the polypropylene according to this invention has branching index g' of less than 0.80, a strain hardening index (SHI@1 s$^{-1}$) of at least 0.40 and multi-branching index (MBI) of at least 0.20. In yet another preferred embodiment the polypropylene according to this invention has branching index g' of less than 0.80, a strain hardening index (SHI@1 s$^{-1}$) of at least 0.50 and multi-branching index (MBI) of at least 0.30.

Preferably the polypropylene of the instant invention is not cross-linked as it is commonly done to improve the process properties of polypropylene. However cross-linking is detrimental in many aspects. Inter alia the manufacture of products thereof is difficult to obtain.

Furthermore, it is preferred that the polypropylene has a melt flow rate (MFR) given in a specific range. The melt flow rate mainly depends on the average molecular weight. This is due to the fact that long molecules render the material a lower flow tendency than short molecules. An increase in molecular weight means a decrease in the MFR-value. The melt flow rate (MFR) is measured in g/10 min of the polymer discharged through a defined dye under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as $MFR_2$. Accordingly, it is preferred that in the present invention the polypropylene has an $MFR_2$ in a range of 0.01 to 1000.00 g/10 min, more preferably of 0.01 to 100.00 g/10 min, still more preferred of 0.05 to 50 g/10 min. In a preferred embodiment, the MFR is in a range of 1.00 to 11.00 g/10 min. In another preferred embodiment, the MFR is in a range of 3.00 to 11.00 g/10 min.

The number average molecular weight (Mn) is an average molecular weight of a polymer expressed as the first moment of a plot of the number of molecules in each molecular weight range against the molecular weight. In effect, this is the total molecular weight of all molecules divided by the number of molecules. In turn, the weight average molecular weight (Mw) is the first moment of a plot of the weight of polymer in each molecular weight range against molecular weight.

The number average molecular weight (Mn) and the weight average molecular weight (Mw) as well as the molecular weight distribution are determined by size exclusion chromatography (SEC) using Waters Alliance GPCV 2000 instrument with online viscometer. The oven temperature is 140° C. Trichlorobenzene is used as a solvent.

It is preferred that the polypropylene has a weight average molecular weight (Mw) from 10,000 to 2,000,000 g/mol, more preferably from 20,000 to 1,500,000 g/mol.

It is preferred that the polypropylene of the instant invention is isotactic.

More preferably, the polypropylene according to this invention shall have a rather high pentad concentration, i.e. higher than 90%, more preferably higher than 92% and most preferably higher than 93%. In another preferred embodiment the pentad concentration is higher than 95%. The pentad concentration is an indicator for the narrowness in the regularity distribution of the polypropylene.

In addition, it is preferred that the polypropylene has a melting temperature Tm of higher than 125° C. It is in particular preferred that the melting temperature is higher than 125° C. if the polypropylene is a polypropylene copolymer as defined below. In turn, in case the polypropylene is a polypropylene homopolymer as defined below, it is preferred, that polypropylene has a melting temperature of higher than 150° C., more preferred higher than 155° C.

More preferably, the polypropylene according to this invention is multimodal, even more preferred bimodal. "Multimodal" or "multimodal distribution" describes a frequency distribution that has several relative maxima. In particular, the expression "modality of a polymer" refers to the form of its molecular weight distribution (MWD) curve, i.e. the appearance of the graph of the polymer weight fraction as a function of its molecular weight. If the polymer is produced in the sequential step process, i.e. by utilizing reactors coupled in series, and using different conditions in each reactor, the different polymer fractions produced in the different reactors each have their own molecular weight distribution which may considerably differ from one another. The molecular weight distribution curve of the resulting final polymer can be seen at a super-imposing of the molecular weight distribution curves of the polymer fraction which will, accordingly, show a more distinct maxima, or at least be distinctively broadened compared with the curves for individual fractions.

A polymer showing such molecular weight distribution curve is called bimodal or multimodal, respectively.

The polypropylene is preferably bimodal.

The polypropylene according to this invention can be homopolymer or a copolymer. Accordingly, the homopolymer as well as the copolymer can be a multimodal, preferably bimodal, polymer composition.

The expression homopolymer used herein relates to a polypropylene that consists substantially, i.e. of at least 97 wt %, preferably of at least 99 wt %, and most preferably of at least 99.8 wt % of propylene units. In a preferred embodiment only propylene units in the propylene homopolymer are detectable. The comonomer content can be determined with FT infrared spectroscopy, as described below in the examples.

In case the polypropylene according to this invention is a propylene copolymer, it is preferred that the comonomer is ethylene. However, also other comonomers known in the art are suitable. Preferably, the total amount of comonomer, more preferably ethylene, in the propylene copolymer is up to 30 wt %, more preferably up to 25 wt %.

In a preferred embodiment, the polypropylene is a propylene copolymer comprising a polypropylene matrix and an ethylene-propylene rubber (EPR).

The polypropylene matrix can be a homopolymer or a copolymer, more preferably multimodal, i.e. bimodal, homopolymer or a multimodal, i.e. bimodal, copolymer. In case the polypropylene matrix is a propylene copolymer, then it is preferred that the comonomer is ethylene or butene. However, also other comonomers known in the art are suitable. The preferred amount of comonomer, more preferably ethylene, in the polypropylene matrix is up to 8.00 Mol %. In case the propylene copolymer matrix has ethylene as the comonomer component, it is in particular preferred that the amount of ethylene in the matrix is up to 8.00 Mol %, more preferably less than 6.00 Mol %. In case the propylene copolymer matrix has butene as the comonomer component, it is in particular preferred that the amount of butene in the matrix is up to 6.00 Mol %, more preferably less than 4.00 Mol %.

Preferably, the ethylene-propylene rubber (EPR) in the total propylene copolymer is up to 80 wt %. More preferably the amount of ethylene-propylene rubber (EPR) in the total propylene copolymer is in the range of 20 to 80 wt %, still more preferably in the range of 30 to 60 wt %.

In addition, it is preferred that the polypropylene being a copolymer comprising a polypropylene matrix and an ethylene-propylene rubber (EPR) with an ethylene-content of up to 50 wt %.

In addition, it is preferred that the polypropylene as defined above is produced in the presence of the catalyst as defined below. Furthermore, for the production of the polypropylene as defined above, the process as stated below is preferably used.

The polypropylene according to this invention is obtainable by a new catalyst system. This new catalyst system comprises an asymmetric catalyst, whereby the catalyst system has a porosity of less than 1.40 ml/g, more preferably less than 1.30 ml/g and most preferably less than 1.00 ml/g. The porosity has been measured according to DIN 66135 ($N_2$). In another preferred embodiment the porosity is below detection limit when determined with the method applied according to DIN 66135.

An asymmetric catalyst according to this invention is preferably a catalyst comprising at least two organic ligands which differ in their chemical structure. More preferably the asymmetric catalyst according to this invention is a metallocene compound comprising at least two organic ligands which differ in their chemical structure. Still more preferably the asymmetric catalyst according to this invention is a metallocene compound comprising at least two organic ligands which differ in their chemical structure and the metallocene compound is free of $C_2$-symmetry and/or any higher symmetry. Preferably the asymmetric catalyst, more preferably the asymmetric metallocene compound, comprises only two different organic ligands, still more preferably comprises only two organic ligands which are different and linked via a bridge.

Said asymmetric catalyst is preferably a single site catalyst (SSC).

Due to the use of the catalyst system with a very low porosity comprising an asymmetric catalyst the manufacture of the above defined multi-branched polypropylene is possible.

Furthermore it is preferred, that the catalyst system has a surface area of less than 25 m$^2$/g, yet more preferred less than 20 m$^2$/g, still more preferred less than 15 m$^2$/g, yet still less than 10 m$^2$/g and most preferred less than 5 m$^2$/g. The surface area according to this invention is measured according to ISO 9277 ($N_2$).

It is in particular preferred that the catalytic system according to this invention comprises an asymmetric catalyst, i.e. a catalyst as defined above and/or below, and has porosity not detectable when applying the method according to DIN 66135 ($N_2$) and has a surface area measured according to ISO 9277 ($N_2$) less than 5 m$^2$/g.

Preferably the asymmetric catalyst compound has a formula (I):

$$(Cp)_2R_nMX_q \qquad (I)$$

wherein

M is Zr, Hf or Ti, preferably Zr each X is independently a monovalent anionic ligand, such as σ-ligand, each Cp is independently an unsaturated organic cyclic ligand which coordinates to M, R is a bridging group linking two ligands L, n is 0 or 1, more preferably 1, q is 1, 2 or 3, more preferably 2, m+q is equal to the valency of the metal, and at least one Cp-ligand, preferably both Cp-ligands, is(are) selected from the group consisting of unsubstituted cyclopenadienyl, unsubstituted indenyl, unsubstituted tetrahydroindenyl, unsubstituted fluorenyl, substituted cyclopenadienyl, substituted indenyl, substituted tetrahydroindenyl, and substituted fluorenyl, with the proviso in case both Cp-ligands are selected from the above stated group that both Cp-ligands must chemically differ from each other, i.e. must preferably have a different chemical structure.

The term "σ-ligand" is understood in the whole description in a known manner, i.e. a group bonded to the metal at one or more places via a sigma bond. A preferred monovalent anionic ligand is halogen, in particular chlorine (Cl).

Preferably, the asymmetric catalyst is of formula (I) indicated above, wherein
M is Zr
each X is Cl,
n is 1, and
q is 2.

Preferably both Cp-ligands have different residues to obtain an asymmetric structure.

Preferably, both Cp-ligands are selected from the group consisting of substituted cyclopenadienyl-ring, substituted indenyl-ring, substituted tetrahydroindenyl-ring, and substituted fluorenyl-ring wherein the Cp-ligands differ in the substituents bonded to the rings.

The optional one or more substituent(s) bonded to cyclopenadienyl, indenyl, tetrahydroindenyl, or fluorenyl may be independently selected from a group including halogen, hydrocarbyl (e.g. $C_1$-$C_{20}$-alkyl, $C_2$-$C_{20}$-alkenyl, $C_2$-$C_{20}$-alkynyl, $C_3$-$C_{12}$-cycloalkyl, $C_6$-$C_{20}$-aryl or $C_7$-$C_{20}$-arylalkyl, $C_3$-$C_{12}$-cycloalkyl which contains 1, 2, 3 or 4 heteroatom(s) in the ring moiety, $C_6$-$C_{20}$-heteroaryl, $C_1$-$C_{20}$-haloalkyl, —SiR''$_3$, —OSiR''$_3$, —SR'', —PR''$_2$ and —NR''$_2$, wherein each R'' is independently a hydrogen or hydrocarbyl, e.g. $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl.

More preferably both Cp-ligands are indenyl moieties wherein each indenyl moiety bear one or two substituents as defined above. More preferably each Cp-ligand is an indenyl moiety bearing two substituents as defined above, with the proviso that the substituents are chosen in such are manner that both Cp-ligands are of different chemical structure, i.e both Cp-ligands differ at least in one substituent bonded to the indenyl moiety, in particular differ in the substituent bonded to the five member ring of the indenyl moiety.

Still more preferably both Cp are indenyl moieties wherein the indenyl moieties comprise at least at the five membered ring of the indenyl moiety, more preferably at 2-position, a substituent selected from the group consisting of alkyl, such as $C_1$-$C_6$ alkyl, e.g. methyl, ethyl, isopropyl, and trialkyloxysiloxy, wherein each alkyl is independently selected from $C_1$-$C_6$ alkyl, such as methyl or ethyl, with proviso that the indenyl moieties of both Cp must chemically differ from each other, i.e. the indenyl moieties of both Cp comprise different substituents.

Still more preferred both Cp are indenyl moieties wherein the indenyl moieties comprise at least at the six membered ring of the indenyl moiety, more preferably at 4-position, a substituent selected from the group consisting of a $C_6$-$C_{20}$ aromatic ring moiety, such as phenyl or naphthyl, preferably phenyl, which is optionally substituted with one or more substituents, such as $C_1$-$C_6$ alkyl, and a heteroaromatic ring moiety, with proviso that the indenyl moieties of both Cp must chemically differ from each other, i.e. the indenyl moieties of both Cp comprise different substituents.

Yet more preferably both Cp are indenyl moieties wherein the indenyl moieties comprise at the five membered ring of the indenyl moiety, more preferably at 2-position, a substituent and at the six membered ring of the indenyl moiety, more preferably at 4-position, a further substituent, wherein the substituent of the five membered ring is selected from the group consisting of alkyl, such as $C_1$-$C_6$ alkyl, e.g. methyl, ethyl, isopropyl, and trialkyloxysiloxy, wherein each alkyl is independently selected from $C_1$-$C_6$ alkyl, such as methyl or ethyl, and the further substituent of the six membered ring is selected from the group consisting of a $C_6$-$C_{20}$ aromatic ring moiety, such as phenyl or naphthyl, preferably phenyl, which is optionally substituted with one or more substituents, such as $C_1$-$C_6$ alkyl, and a heteroaromatic ring moiety, with proviso that the indenyl moieties of both Cp must chemically differ from each other, i.e. the indenyl moieties of both Cp comprise different substituents. It is in particular preferred that both Cp are idenyl rings comprising two substitutes each and differ in the substituents bonded to the five membered ring of the idenyl rings.

Concerning the moiety "R" it is preferred that "R" has the formula (II)

—Y(R')$_2$— (II)

wherein
Y is C, Si or Ge, and
R' is $C_1$ to $C_{20}$ alkyl, $C_6$-$C_{12}$ aryl, $C_7$-$C_{12}$ arylalkyl, or trimethylsilyl.

In case both Cp-ligands of the asymmetric catalyst as defined above, in particular case of two indenyl moieties, are linked with a bridge member R, the bridge member R is typically placed at 1-position.

The bridge member R may contain one or more bridge atoms selected from e.g. C, Si and/or Ge, preferably from C and/or Si. One preferable bridge R is —Si(R')$_2$—, wherein R' is selected independently from one or more of e.g. $C_1$-$C_{10}$ alkyl, $C_1$-$C_{20}$ alkyl, such as $C_6$-$C_{12}$ aryl, or $C_7$-$C_{40}$, such as $C_7$-$C_{12}$ arylalkyl, wherein alkyl as such or as part of arylalkyl is preferably $C_1$-$C_6$ alkyl, such as ethyl or methyl, preferably methyl, and aryl is preferably phenyl. The bridge —Si(R')$_2$— is preferably e.g. —Si($C_1$-$C_6$ alkyl)$_2$-, —Si(phenyl)$_2$- or —Si($C_1$-$C_6$ alkyl)(phenyl)-, such as —Si(Me)$_2$-.

In a preferred embodiment the asymmetric catalyst is defined by the formula (III)

(Cp)$_2$R$_1$ZrX$_2$ (III)

wherein
each X is independently a monovalent anionic ligand, such as σ-ligand, in particular halogen
both Cp coordinate to M and are selected from the group consisting of unsubstituted cyclopenadienyl, unsubstituted indenyl, unsubstituted tetrahydroindenyl, unsubstituted fluorenyl, substituted cyclopenadienyl, substituted indenyl, substituted tetrahydroindenyl, and substituted fluorenyl, with the proviso that both Cp-ligands must chemically differ from each other, and
R is a bridging group linking two ligands L,
wherein R is defined by the formula (II)

—Y(R')$_2$— (II)

wherein
Y is C, Si or Ge, and
R' is $C_1$ to $C_{20}$ alkyl, $C_6$-$C_{12}$ aryl, $C_7$-$C_{12}$ arylalkyl or trimethylsilyl.

More preferably the asymmetric catalyst is defined by the formula (III), wherein both Cp are selected from the group consisting of substituted cyclopenadienyl, substituted indenyl, substituted tetrahydroindenyl, and substituted fluorenyl.

Yet more preferably the asymmetric catalyst is defined by the formula (III), wherein both Cp are selected from the group consisting of substituted cyclopenadienyl, substituted indenyl, substituted tetrahydroindenyl, and substituted fluorenyl with the proviso that both Cp-ligands differ in the substituents, i.e. the substituents as defined above, bonded to cyclopenadienyl, indenyl, tetrahydroindenyl, or fluorenyl.

Still more preferably the asymmetric catalyst is defined by the formula (III), wherein both Cp are indenyl and both indenyl differ in one substituent, i.e. in a substituent as defined above bonded to the five member ring of indenyl.

It is in particular preferred that the asymmetric catalyst is a non-silica supported catalyst as defined above, in particular a metallocene catalyst as defined above.

In a preferred embodiment the asymmetric catalyst is dimethylsilandiyl [(2-methyl-(4'-tert.butyl)-4-phenyl-indenyl) (2-isopropyl-(4'-tert.butyl)-4-phenyl-indenyl)]zirkonium dichloride. More preferred said asymmetric catalyst is not silica supported.

The above described asymmetric catalyst components are prepared according to the methods described in WO 01/48034.

It is in particular preferred that the asymmetric catalyst system is obtained by the emulsion solidification technology as described in WO 03/051934. This document is herewith included in its entirety by reference. Hence the asymmetric catalyst is preferably in the form of solid catalyst particles, obtainable by a process comprising the steps of
   a) preparing a solution of one or more asymmetric catalyst components;
   b) dispersing said solution in a solvent immiscible therewith to form an emulsion in which said one or more catalyst components are present in the droplets of the dispersed phase,
   c) solidifying said dispersed phase to convert said droplets to solid particles and optionally recovering said particles to obtain said catalyst.

Preferably a solvent, more preferably an organic solvent, is used to form said solution. Still more preferably the organic solvent is selected from the group consisting of a linear alkane, cyclic alkane, linear alkene, cyclic alkene, aromatic hydrocarbon and halogen-containing hydrocarbon.

Moreover, the immiscible solvent forming the continuous phase is an inert solvent, more preferably the immiscible solvent comprises a fluorinated organic solvent and/or a functionalized derivative thereof, still more preferably the immiscible solvent comprises a semi-, highly- or perfluorinated hydrocarbon and/or a functionalized derivative thereof. It is in particular preferred, that said immiscible solvent comprises a perfluoro hydrocarbon or a functionalized derivative thereof, preferably $C_3$-$C_{30}$ perfluoroalkanes, -alkenes or -cycloalkanes, more preferred $C_4$-$C_{10}$ perfluoro-alkanes, -alkenes or -cycloalkanes, particularly preferred perfluorohexane, perfluoroheptane, perfluorooctane or perfluoro(methylcyclohexane) or a mixture thereof.

Furthermore it is preferred that the emulsion comprising said continuous phase and said dispersed phase is a bi- or multiphasic system as known in the art. An emulsifier may be used for forming the emulsion. After the formation of the emulsion system, said catalyst is formed in situ from catalyst components in said solution.

In principle, the emulsifying agent may be any suitable agent which contributes to the formation and/or stabilization of the emulsion and which does not have any adverse effect on the catalytic activity of the catalyst. The emulsifying agent may e.g. be a surfactant based on hydrocarbons optionally interrupted with (a) heteroatom(s), preferably halogenated hydrocarbons optionally having a functional group, preferably semi-, highly- or perfluorinated hydrocarbons as known in the art. Alternatively, the emulsifying agent may be prepared during the emulsion preparation, e.g. by reacting a surfactant precursor with a compound of the catalyst solution. Said surfactant precursor may be a halogenated hydrocarbon with at least one functional group, e.g. a highly fluorinated $C_1$ to $C_{30}$ alcohol, which reacts e.g. with a cocatalyst component, such as aluminoxane.

In principle any solidification method can be used for forming the solid particles from the dispersed droplets. According to one preferable embodiment the solidification is effected by a temperature change treatment. Hence the emulsion subjected to gradual temperature change of up to 10° C./min, preferably 0.5 to 6° C./min and more preferably 1 to 5° C./min. Even more preferred the emulsion is subjected to a temperature change of more than 40° C., preferably more than 50° C. within less than 10 seconds, preferably less than 6 seconds.

The recovered particles have preferably an average size range of 5 to 200 μm, more preferably 10 to 100 μm.

Moreover, the form of solidified particles have preferably a spherical shape, a predetermined particles size distribution and a surface area as mentioned above of preferably less than 25 $m^2$/g, still more preferably less than 20 $m^2$/g, yet more preferably less than 15 $m^2$/g, yet still more preferably less than 10 $m^2$/g and most preferably less than 5 $m^2$/g, wherein said particles are obtained by the process as described above.

For further details, embodiments and examples of the continuous and dispersed phase system, emulsion formation method, emulsifying agent and solidification methods reference is made e.g. to the above cited international patent application WO 03/051934.

As mentioned above the catalyst system may further comprise an activator as a cocatalyst, as described in WO 03/051934, which is enclosed herein with reference.

Preferred as cocatalysts for metallocenes and non-metallocenes, if desired, are the aluminoxanes, in particular the $C_1$-$C_{10}$-alkylaluminoxanes, most particularly methylaluminoxane (MAO). Such aluminoxanes can be used as the sole cocatalyst or together with other cocatalyst(s). Thus besides or in addition to aluminoxanes, other cation complex forming catalysts activators can be used. Said activators are commercially available or can be prepared according to the prior art literature.

Further aluminoxane cocatalysts are described inter alia in WO 94/28034 which is incorporated herein by reference. These are linear or cyclic oligomers of having up to 40, preferably 3 to 20, —(Al(R''')O)— repeat units (wherein R''' is hydrogen, $C_1$-$C_{10}$-alkyl (preferably methyl) or $C_6$-$C_{18}$-aryl or mixtures thereof).

The use and amounts of such activators are within the skills of an expert in the field. As an example, with the boron activators, 5:1 to 1:5, preferably 2:1 to 1:2, such as 1:1, ratio of the transition metal to boron activator may be used. In case of preferred aluminoxanes, such as methylaluminumoxane (MAO), the amount of Al, provided by aluminoxane, can be chosen to provide a molar ratio of Al:transition metal e.g. in the range of 1 to 10 000, suitably 5 to 8000, preferably 10 to 7000, e.g. 100 to 4000, such as 1000 to 3000. Typically in case of solid (heterogeneous) catalyst the ratio is preferably below 500.

The quantity of cocatalyst to be employed in the catalyst of the invention is thus variable, and depends on the conditions and the particular transition metal compound chosen in a manner well known to a person skilled in the art.

Any additional components to be contained in the solution comprising the organotransition compound may be added to said solution before or, alternatively, after the dispersing step.

Furthermore, the present invention is related to the use of the above-defined catalyst system for the production of polymers, in particular of a polypropylene according to this invention.

In addition, the present invention is related to the process for producing the inventive polypropylene, whereby the catalyst system as defined above is employed. Furthermore it is preferred that the process temperature is higher than 60° C. Preferably, the process is a multi-stage process to obtain multimodal polypropylene as defined above.

Multistage processes include also bulk/gas phase reactors known as multizone gas phase reactors for producing multimodal propylene polymer.

A preferred multistage process is a "loop-gas phase"-process, such as developed by Borealis A/S, Denmark (known as BORSTAR® technology) described e.g. in patent literature, such as in EP 0 887 379 or in WO 92/12182.

Multimodal polymers can be produced according to several processes which are described, e.g. in WO 92/12182, EP 0 887 379 and WO 97/22633.

A multimodal polypropylene according to this invention is produced preferably in a multi-stage process in a multi-stage reaction sequence as described in WO 92/12182. The contents of this document are included herein by reference.

It has previously been known to produce multimodal, in particular bimodal, polypropylene in two or more reactors connected in series, i.e. in different steps (a) and (b).

Preferably the process as defined above and further defined below is a slurry polymerization, even more preferred a bulk polymerization.

According to the present invention, the main polymerization stages are preferably carried out as a combination of a slurry polymerization/gas phase polymerization, more preferred the main polymerization stages are preferably carried out as a combination of bulk polymerization/gas phase polymerization.

The bulk polymerization is preferably performed in a so-called loop reactor.

As used herein, the term "slurry polymerization" means a polymerization process that involves at least two phases, e.g. in which particulate, solid polymer (e.g. granular) is formed in a liquid or polymerization medium, or in a liquid/vapour polymerization medium. Certain embodiments of the processes described herein are slurry polymerizations, e.g. processes in which the products of polymerization are solid. The polymerization products (e.g. polypropylenes) in those processes preferably have melting points sufficiently high to avoid melting during polymerization, so that they can in many cases be recovered as granular polymer. A slurry polymerization may include solvent (i.e. which is also referred to as diluent), or it may be a bulk process, discussed below.

As used herein, the term "bulk process" means a polymerization process in which the polymerization medium consists entirely of or consists essentially of monomers and any products of polymerization that has taken place, e.g. macromers and polymers, but does not include solvent (i.e. which also means that no diluent is present), or includes minor amounts of solvent, defined as less than 50 volume percent, and preferably much less.

In order to produce the multimodal polypropylene according to this invention, a flexible mode is preferred. For this reason, it is preferred that the composition be produced in two main polymerization stages in combination of loop reactor/gas phase reactor.

Optionally, and preferably, the process may also comprise a pre-polymerization step in a manner known in the field and which may precede the polymerization step (a).

If desired, a further elastomeric comonomer component, so called ethylene-propylene rubber (EPR) component as defined in this invention, may be incorporated into the obtained propylene polymer to form a propylene copolymer as defined above. The ethylene-propylene rubber (EPR) component may preferably be produced after the gas phase polymerization step (b) in a subsequent second or further gas phase polymerizations using one or more gas phase reactors.

The process is preferably a continuous process.

Preferably, in the process for producing the propylene polymer as defined above the conditions for the bulk reactor of step (a) may be as follows:
 the temperature is within the range of 40° C. to 110° C., preferably between 60° C. and 100° C., 70 to 90° C.,
 the pressure is within the range of 20 bar to 80 bar, preferably between 30 bar to 60 bar,
 hydrogen can be added for controlling the molar mass in a manner known per se.

Subsequently, the reaction mixture from the bulk (bulk) reactor (step a) is transferred to the gas phase reactor, i.e. to step (b), whereby the conditions in step (b) are preferably as follows:
 the temperature is within the range of 50° C. to 130° C., preferably between 60° C. and 100° C.,
 the pressure is within the range of 5 bar to 50 bar, preferably between 15 bar to 35 bar,
 hydrogen can be added for controlling the molar mass in a manner known per se.

The residence time can vary in both reactor zones. In one embodiment of the process for producing the propylene polymer the residence time in bulk reactor, e.g. loop is in the range 0.5 to 5 hours, e.g. 0.5 to 2 hours and the residence time in gas phase reactor will generally be 1 to 8 hours.

If desired, the polymerization may be effected in a known manner under supercritical conditions in the bulk, preferably loop reactor, and/or as a condensed mode in the gas phase reactor.

The process of the invention or any embodiments thereof above enable highly feasible means for producing and further tailoring the propylene polymer composition within the invention, e.g. the properties of the polymer composition can be adjusted or controlled in a known manner e.g. with one or more of the following process parameters: temperature, hydrogen feed, comonomer feed, propylene feed e.g. in the gas phase reactor, catalyst, the type and amount of an external donor (if used), split between components.

The above process enables very feasible means for obtaining the reactor-made propylene polymer as defined above.

In the following, the present invention is described by way of examples.

EXAMPLES

Examples

1. Definitions/Measuring Methods

The following definitions of terms and determination methods apply for the above general description of the invention as well as to the below examples unless otherwise defined.

A. Pentad Concentration

For the meso pentad concentration analysis, also referred herein as pentad concentration analysis, the assignment analysis is undertaken according to T Hayashi, Pentad concentration, R. Chujo and T. Asakura, Polymer 29 138-43 (1988) and Chujo R, et al., Polymer 35 339 (1994)

B. Multi-branching Index

1. Acquiring the Experimental Data

Polymer is melted at T=180° C. and stretched with the SER Universal Testing Platform as described below at deformation rates of dε/dt=0.1 0.3 1.0 3.0 and 10 s$^{-1}$ in subsequent experiments. The method to acquire the raw data is described in Sentmanat et al., J. Rheol. 2005, Measuring the Transient Elongational Rheology of Polyethylene Melts Using the SER Universal Testing Platform.

Experimental Setup

A Paar Physica MCR300, equipped with a TC30 temperature control unit and an oven CTT600 (convection and radiation heating) and a SERVP01-025 extensional device with temperature sensor and a software RHEOPLUS/32 v2.66 is used.

Sample Preparation

Stabilized Pellets are compression moulded at 220° C. (gel time 3 min, pressure time 3 min, total moulding time 3+3=6 min) in a mould at a pressure sufficient to avoid bubbles in the specimen, cooled to room temperature. From such prepared plate of 0.7 mm thickness, stripes of a width of 10 mm and a length of 18 mm are cut.

Check of the SER Device

Because of the low forces acting on samples stretched to thin thicknesses, any essential friction of the device would deteriorate the precision of the results and has to be avoided.

In order to make sure that the friction of the device is less than a threshold of 5×10-3 mNm (Milli-Newtonmeter) which is required for precise and correct measurements, following check procedure is performed prior to each measurement:

The device is set to test temperature (180° C.) for minimum 20 minutes without sample in presence of the clamps A standard test with 0.3 s$^{-1}$ is performed with the device on test temperature (180° C.)

The torque (measured in mNm) is recorded and plotted against time

The torque must not exceed a value of 5×10$^{-3}$ mNm to make sure that the friction of the device is in an acceptably low range Conducting the Experiment The device is heated for 20 min to the test temperature (180° C. measured with the thermocouple attached to the SER device) with clamps but without sample. Subsequently, the sample (0.7×10×18 mm), prepared as described above, is clamped into the hot device. The sample is allowed to melt for 2 minutes+/−20 seconds before the experiment is started.

During the stretching experiment under inert atmosphere (nitrogen) at constant Hencky strain rate, the torque is recorded as function of time at isothermal conditions (measured and controlled with the thermocouple attached to the SER device).

After stretching, the device is opened and the stretched film (which is winded on the drums) is inspected. Homogenous extension is required. It can be judged visually from the shape of the stretched film on the drums if the sample stretching has been homogenous or not. The tape must be wound up symmetrically on both drums, but also symmetrically in the upper and lower half of the specimen.

If symmetrical stretching is confirmed hereby, the transient elongational viscosity calculates from the recorded torque as outlined below.

2. Evaluation

For each of the different strain rates dε/dt applied, the resulting tensile stress growth function $\eta_E^+$ (dε/dt, t) is plotted against the total Hencky strain ε to determine the strain hardening behaviour of the melt, see FIG. 1.

In the range of Hencky strains between 1.0 and 3.0, the tensile stress growth function $\eta_E^+$ can be well fitted with a function $$\eta_E^+(\dot{\epsilon}, \epsilon) = c_1 \cdot \epsilon^{c_2}$$

where $c_1$ and $c_2$, are fitting variables. Such derived $c_2$, is a measure for the strain hardening behavior of the melt and called strain hardening index (SHI).

Dependent on the polymer architecture, SHI can
  be independent of the strain rate (linear materials, Y— or H— structures)
  increase with strain rate (short chain-, hyper- or multi-branched structures).

Figure 2:
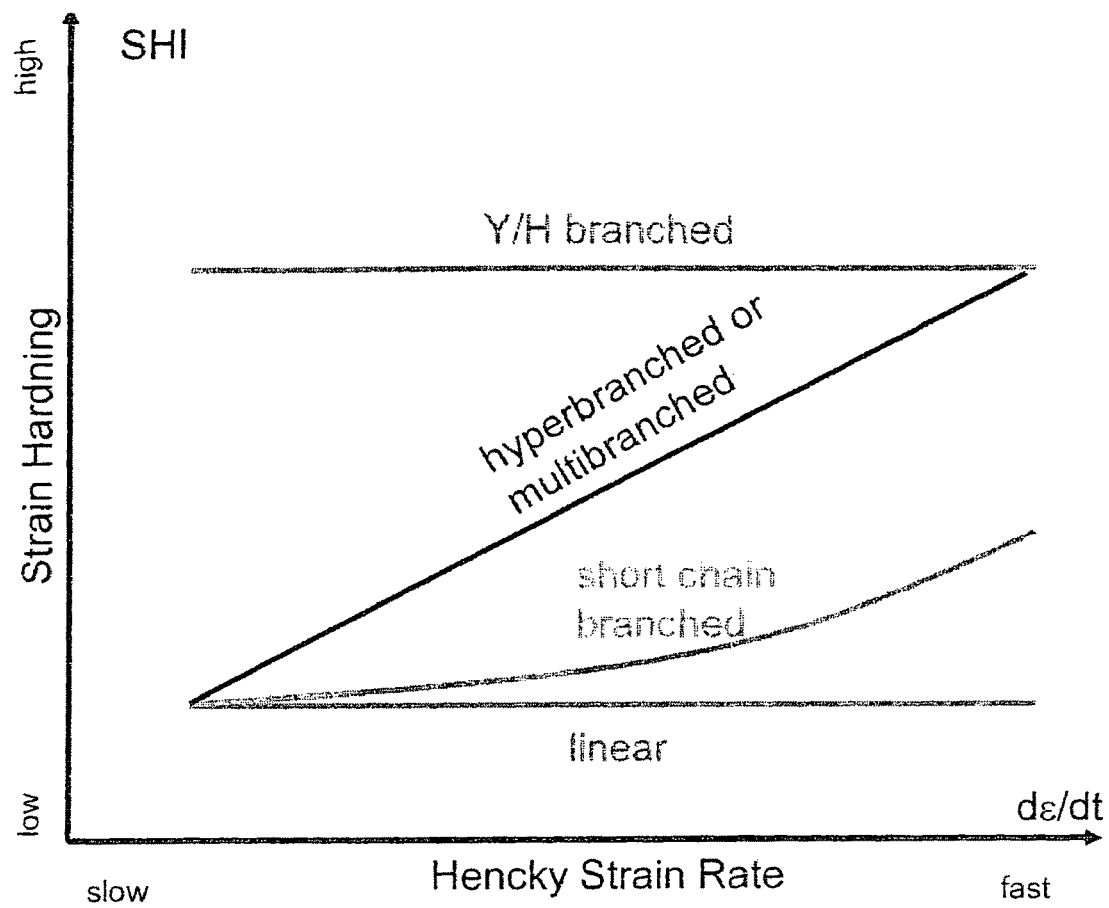
Figure 3:
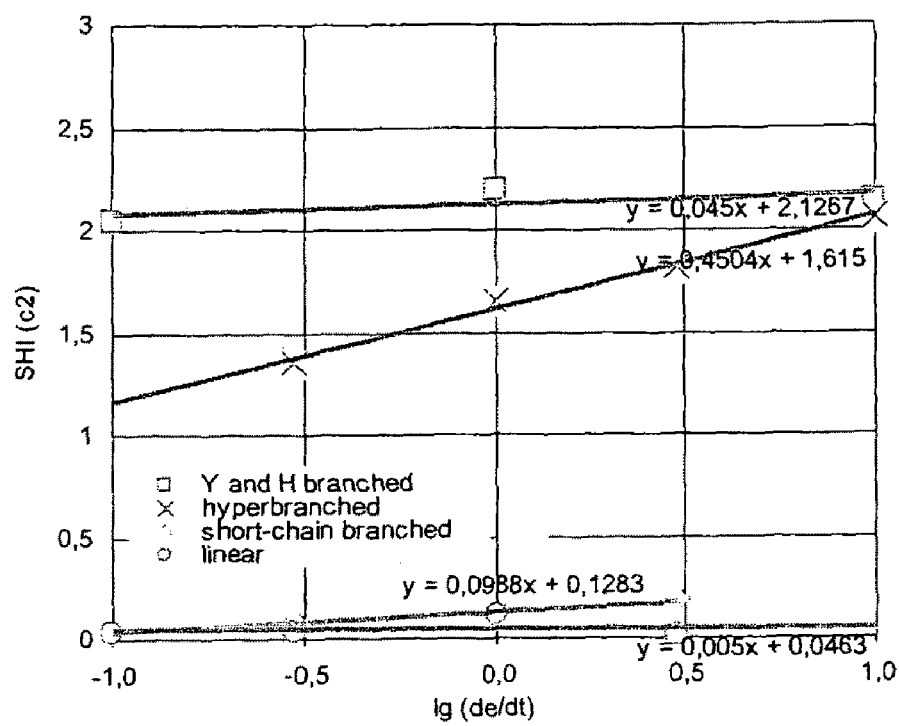

This is illustrated in FIG. 2.

For polyethylene, linear (HDPE), short-chain branched (LLDPE) and hyperbranched structures (LDPE) are well known and hence they are used to illustrate the structural analytics based on the results on extensional viscosity. They are compared with a polypropylene with Y and H-structures with regard to their change of the strain-hardening behavior as function of strain rate, see FIG. 2 and Table 1.

To illustrate the determination of SHI at different strain rates as well as the multi-branching index (MBI) four polymers of known chain architecture are examined with the analytical procedure described above.

The first polymer is a H- and Y-shaped polypropylene homopolymer made according to EP 879 830 ("A") example 1 through adjusting the MFR with the amount of butadiene. It has a MFR230/2.16 of 2.0 g/10 min, a tensile modulus of 1950 MPa and a branching index G' of 0.7.

The second polymer is a commercial hyperbranched LDPE, Borealis "B", made in a high pressure process known in the art. It has a MFR190/2.16 of 4.5 and a density of 923 kg/m$^3$.

The third polymer is a short chain branched LLDPE, Borealis "C", made in a low pressure process known in the art. It has a MFR190/2.16 of 1.2 and a density of 919 kg/m$^3$.

The fourth polymer is a linear HDPE, Borealis "D", made in a low pressure process known in the art. It has a MFR190/2.16 of 4.0 and a density of 954 kg/m$^3$.

The four materials of known chain architecture are investigated by means of measurement of the transient elongational viscosity at 180° C. at strain rates of 0.10, 0.30, 1.0, 3.0 and 10 s$^{-1}$. Obtained data (transient elongational viscosity versus Hencky strain) is fitted with a function $$\eta_E^+ = c_1 * \epsilon^{c_2}$$

for each of the mentioned strain rates. The parameters c1 and c2 are found through plotting the logarithm of the transient elongational viscosity against the logarithm of the Hencky strain and performing a linear fit of this data applying the least square method. The parameter c1 calculates from the intercept of the linear fit of the data lg($\eta_E^+$) versus lg(ε) from $$c_1 = 10^{Intercept}$$

and $c_2$ is the strain hardening index (SHI) at the particular strain rate.

This procedure is done for all five strain rates and hence, SHI@0.1 s$^{-1}$, SHI@0.3 s$^{-1}$, SHI@1.0 s$^{-1}$, SHI@3.0 s$^{-1}$, SHI@10 s$^{-1}$ are determined, see FIG. 1 and Table 1.

TABLE 1

SHI-values

| dε/dt | lg (dε/dt) | Property | Y and H branched PP A | Hyper-branched LDPE B | short-chain branched LLDPE C | Linear HDPE D |
|---|---|---|---|---|---|---|
| 0.1 | −1.0 | SHI@0.1 s$^{-1}$ | 2.05 | — | 0.03 | 0.03 |
| 0.3 | −0.5 | SHI@0.3 s$^{-1}$ | — | 1.36 | 0.08 | 0.03 |
| 1 | 0.0 | SHI@1.0 s$^{-1}$ | 2.19 | 1.65 | 0.12 | 0.11 |
| 3 | 0.5 | SHI@3.0 s$^{-1}$ | — | 1.82 | 0.18 | 0.01 |
| 10 | 1.0 | SHI@10 s$^{-1}$ | 2.14 | 2.06 | — | — |

From the strain hardening behaviour measured by the values of the SHI@1 s$^{-1}$ one can already clearly distinguish between two groups of polymers: Linear and short-chain branched have a SHI@1 s$^{-1}$ significantly smaller than 0.30. In contrast, the Y and H-branched as well as hyper-branched materials have a SHI@1 s$^{-1}$ significantly larger than 0.30.

In comparing the strain hardening index at those five strain rates $\dot{\epsilon}_H$ of 0.10, 0.30, 1.00, 3.00 and 10.0 s$^{-1}$, the slope of SHI as function of the logarithm to the basis 10 of $\dot{\epsilon}_H$, 1 g ($\dot{\epsilon}_H$), is a characteristic measure for multi-branching. Therefore, a multi-branching index (MBI) is calculated from the slope of a linear fitting curve of SHI versus 1 g($\dot{\epsilon}_H$):

$$SHI(\dot{\epsilon}_H)=c3+MBI*1\ g(\dot{\epsilon}_H)$$

The parameters c3 and MBI are found through plotting the SHI against the logarithm to the basis 10 of the Hencky strain rate 1 g($\dot{\epsilon}_H$) and performing a linear fit of this data applying the least square method. Please refer to FIG. 2.

TABLE 2

Multi-branched-index (MBI)

| Property | Y and H branched PP A | Hyper-branched LDPE B | short-chain branched LLDPE C | Linear HDPE D |
|---|---|---|---|---|
| MBI | 0.04 | 0.45 | 0.10 | 0.01 |

The multi-branching index MBI allows now to distinguish between Y or H-branched polymers which show a MBI smaller than 0.05 and hyper-branched polymers which show a MBI larger than 0.15. Further, it allows to distinguish between short-chain branched polymers with MBI larger than 0.10 and linear materials which have a MBI smaller than 0.10.

Similar results can be observed when comparing different polypropylenes, i.e. polypropylenes with rather high branched structures have higher SHI and MBI-values, respectively, compared to their linear counterparts. Similar to the hyper-branched polyethylenes the new developed polypropylenes show a high degree of branching. However the polypropylenes according to the instant invention are clearly distinguished in the SHI and MBI-values when compared to known hyper-branched polyethylenes. Without being bound on this theory, it is believed, that the different SHI and MBI-values are the result of a different branching architecture. For this reason the new found branched polypropylenes according to this invention are designated as multi-branched.

Combining both, strain hardening index (SHI) and multi-branching index (MBI), the chain architecture can be assessed as indicated in Table 3:

TABLE 3

Strain Hardening Index (SHI) and Multi-branching Index (MBI) for various chain architectures

| Property | Y and H branched | Hyper-branched/ Multi-branched | short-chain branched | linear |
|---|---|---|---|---|
| SHI@1.0 s$^{-1}$ | >0.30 | >0.30 | ≦0.30 | ≦0.30 |
| MBI | ≦0.10 | >0.10 | ≦0.10 | ≦0.10 |

C. Further Measuring Methods

Particle size distribution: Particle size distribution is measured via Coulter Counter LS 200 at room temperature with n-heptane as medium.

NMR

NMR-Spectroscopy Measurements:

The $^{13}$C-NMR spectra of polypropylenes were recorded on Bruker 400 MHz spectrometer at 130° C. from samples dissolved in 1,2,4-trichlorobenzene/benzene-d6 (90/10 w/w). For the pentad analysis the assignment is done according to the methods described in literature: (T. Hayashi, Y. Inoue, R. Chüjö, and T. Asakura, Polymer 29 138-43 (1988) and Chujo R, et al, Polymer 35 339 (1994).

The NMR-measurement was used for determining the mmmm pentad concentration in a manner well known in the art.

Number average molecular weight ($M_n$), weight average molecular weight ($M_w$) and molecular weight distribution (MWD) are determined by size exclusion chromatography (SEC) using Waters Alliance GPCV 2000 instrument with online viscometer. The oven temperature is 140° C. Trichlorobenzene is used as a solvent (ISO 16014).

Melting temperature Tm, crystallization temperature Tc, and the degree of crystallinity: measured with Mettler TA820 differential scanning calorimetry (DSC) on 5-10 mg samples. Both crystallization and melting curves were obtained during 10° C./min cooling and heating scans between 30° C. and 225° C. Melting and crystallization temperatures were taken as the peaks of endotherms and exotherms.

Also the melt- and crystallization enthalpy (Hm and Hc) were measured by the DSC method according to ISO 11357-3.

MFR$_2$: measured according to ISO 1133 (230° C., 2.16 kg load).

Intrinsic viscosity: is measured according to DIN ISO 1628/1, October 1999 (in Decalin at 135° C.).

Comonomer content is measured with Fourier transform infrared spectroscopy (FTIR) calibrated with $^{13}$C-NMR. When measuring the ethylene content in polypropylene, a thin film of the sample (thickness about 250 mm) was prepared by hot-pressing. The area of —CH$_2$— absorption peak (800-650 cm$^{-1}$) was measured with Perkin Elmer FTIR 1600 spectrometer. The method was calibrated by ethylene content data measured by $^{13}$C-NMR.

Porosity: is measured according to DIN 66135

Surface area: is measured according to ISO 9277

3. EXAMPLES

Example 1

Comparison

A silica supported metallocene catalyst (I) was prepared according to WO 01/48034 (example 27). The porosity of the support is 1.6 ml/g. An asymmetric metallocene dimethylsilandiyl [(2-methyl-(4'-tert.butyl)-4-phenyl-indenyl)(2-isopropyl-(4'-tert.butyl)-4-phenyl-indenyl)]zirkonium dichloride has been used.

A 5 liter stainless steel reactor was used for propylene polymerizations. 110 g of liquid propylene (Borealis polymerization grade) was fed to reactor. 0.2 ml triethylaluminum (100%, purchased from Crompton) was fed as a scavenger and 3.7 mmol hydrogen (quality 6.0, supplied by Å ga) as chain transfer agent. Reactor temperature was set to 30° C. 21 mg catalyst was flushed into to the reactor with nitrogen overpressure. The reactor was heated up to 60° C. in a period of about 14 minutes. Polymerization was continued for 30 minutes at 60° C., then propylene was flushed out, the polymer was dried and weighed.

Polymer yield was weighed to 182 g.

The SHI@1 s$^{-1}$ is 0.29. The MBI is 0.04. The g' is 1.00. This indicates linear structure. The MFR$_{230/2.16}$ is 7.9 g/10 min. The melting temperature is 155° C.

Example 2

Comparison

The catalyst (II) was prepared as described in example 5 of WO 03/051934.

A 5 liter stainless steel reactor was used for propylene polymerizations. 1100 g of liquid propylene (Borealis polymerization grade) was fed to reactor. 0.1 ml triethylaluminum (100%, purchased from Crompton) was fed as a scavenger and 15 mmol hydrogen (quality 6.0, supplied by Å ga) as chain transfer agent. Reactor temperature was set to 30° C. 21 mg catalyst was flushed into to the reactor with nitrogen overpressure. The reactor was heated up to 70° C. in a period of about 14 minutes. Polymerization was continued for 50 minutes at 70° C., then propylene was flushed out, 5 mmol hydrogen were fed and the reactor pressure was increased to 20 bars by feeding (gaseous-) propylene. Polymerization continued in gas-phase for 210 minutes, then the reactor was flashed, the polymer was dried and weighed.

Polymer yield was weighed to 790 g, that equals a productivity of 36.9 kg$_{PP}$/g$_{catalyst}$.

The SHI@1 s$^{-1}$ is 0.15. The MBI is 0.12. The g' is 0.95. This indicates short-chain branched structure (SCB).

Example 3

Inventive

A support-free catalyst (III) has been prepared as described in example 5 of WO 03/051934 whilst using an asymmetric metallocene dimethylsilandiyl [(2-methyl-(4'-tert.butyl)-4-phenyl-indenyl)(2-isopropyl-(4'-tert.butyl)-4-phenyl-indenyl)]zirkonium dichloride.

A 5 liter stainless steel reactor was used for propylene polymerizations. 1100 g of liquid propylene (Borealis polymerization grade) was fed to reactor. 0.1 ml triethylaluminum (100%, purchased from Crompton) was fed as a scavenger and 3.7 mmol hydrogen (quality 6.0, supplied by Å ga) as chain transfer agent. Reactor temperature was set to 30° C. 20 mg catalyst were flushed into to the reactor with nitrogen overpressure. The reactor was heated up to 70° C. in a period of about 14 minutes. Polymerization was continued for 30 minutes at 70° C., then propylene was flushed out, the polymer was dried and weighed.

Polymer yield was weighed to =390 g.

Figure 4:
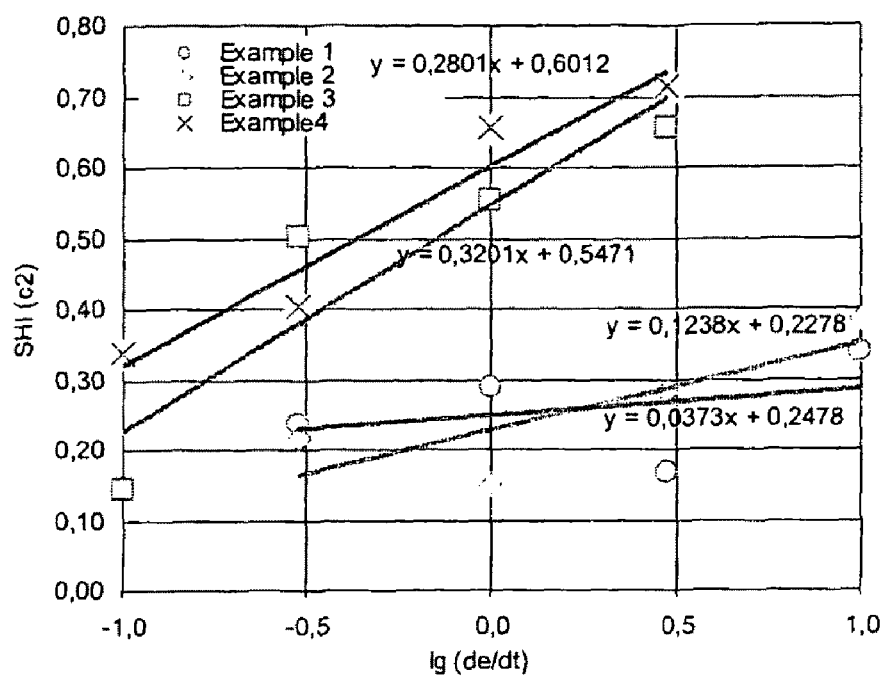

The SHI@1 s$^{-1}$ is 0.55. The MBI is 0.32. The g' is 0.70. The MFR is 10.7. This indicates multi-branched structure. More data is given in Table 4 and FIG. 4.

Example 4

Inventive

The same catalyst (III) as that of example 3 was used.

A 5 liter stainless steel reactor was used for propylene polymerizations. 1100 g of liquid propylene+50 g of ethylene (Borealis polymerization grade) was fed to reactor. 0.1 ml triethylaluminum (100%, purchased from Crompton) was fed as a scavenger and 7.5 mmol hydrogen (quality 6.0, supplied by Å ga) as chain transfer agent. Reactor temperature was set to 30° C. 21 mg catalyst were flushed into to the reactor with nitrogen overpressure. The reactor was heated up to 70° C. in a period of about 14 minutes. Polymerization was continued for 30 minutes at 70° C., then propylene was flushed out, the polymer was dried and weighed. The total ethylene content is 4.2 wt %. The melting point is 125.6° C.

Polymer yield was weighed to 258 g.

The SHI@1 s$^{-1}$ is 0.66. The MBI is 0.28. The g' is 0.70. The MFR is 8.6. This indicates multi-branched structure. More data is given in Table 4 and FIG. 4.

TABLE 4

| | Results | | | |
|---|---|---|---|---|
| Property | Example 1 | Example 2 | Example 3 | Example 4 |
| Catalyst | I | II | III | III |
| Porosity [ml/g] | 1.6 | Non porous | Non porous | Non porous |
| Polymer Type | Homopolymer | Homopolymer | Homopolymer | Copolymer |
| MFR$_{230/2.16}$ [g/10 min] | 7.9 | 2.8 | 10.7 | 8.6 |
| g' | 1.0 | 0.95 | 0.7 | 0.7 |
| SHI@0.1 s$^{-1}$ | — | — | 0.14 | 0.34 |
| SHI@0.3 s$^{-1}$ | 0.24 | 0.22 | 0.50 | 0.40 |
| SHI@1.0 s$^{-1}$ | 0.29 | 0.15 | 0.55 | 0.66 |
| SHI@3.0 s$^{-1}$ | 0.17 | 0.28 | 0.66 | 0.71 |
| SHI@10 s$^{-1}$ | 0.34 | 0.38 | — | — |
| MBI | 0.04 | 0.12 | 0.32 | 0.28 |
| Structure | Linear | SCB | Multibranched | Multibranched |
| mmmm | 0.96 | 0.95 | 0.96 | — |
| Tm [° C.] | 155 | 151 | 155 | 125.6 |

The invention claimed is:

1. Polypropylene having a multi-branching index (MBI) of at least 0.15,
   wherein the multi-branching index (MBI) is defined as the slope of strain hardening index (SHI) as a function of the logarithm to the base 10 of the Hencky strain rate ($\lg(d\epsilon/dt)$),
   wherein $d\epsilon/dt$ is the deformation rate, $\epsilon$ is the Hencky strain, and the strain hardening index (SHI) is measured at 180° C.,
   wherein the strain hardening index (SHI) is defined as the slope of the logarithm to the base 10 of the tensile stress growth function ($\lg(\eta_E^+)$) as a function of the logarithm to the base 10 of the Hencky strain ($\lg(\epsilon)$) in the range of Hencky strains between 1 and 3,
   wherein the polypropylene has been produced in the presence of a catalyst system comprising an asymmetric non-silica supported catalyst, and
   wherein the polypropylene has a strain hardening index (SHI@1 s$^{-1}$) of at least 0.40 measured by a deformation rate ($d\epsilon/dt$) of 1.00 s$^{-1}$ at a temperature of 180° C.

2. Polypropylene according to claim 1, wherein the polypropylene has a branching index g' of less than 1.00.

3. Polypropylene according to claim 1, wherein the polypropylene has melt flow rate MFR$_2$ measured at 230° C. in the range 0.01 to 1000.00 g/10 min.

4. Polypropylene according to claim 1, wherein the polypropylene has mmmm pentad concentration of higher than 90%.

5. Polypropylene according to claim 1, wherein the polypropylene has a melting point Tm of at least 125° C.

6. Polypropylene according to claim 1, wherein the polypropylene is multimodal.

7. Polypropylene according to claim 1, wherein the polypropylene is a propylene homopolymer.

8. Polypropylene according to claim 1, wherein the polypropylene is propylene copolymer.

9. Propylene according to claim 8, wherein a the comonomer of the propylene copolymer is ethylene.

10. Polypropylene according to claim 9, wherein the total amount of comonomer in the propylene copolymer is up to 30 wt %.

11. Polypropylene according to claim 8, wherein the propylene copolymer comprises a polypropylene matrix and an ethylene-propylene rubber (EPR).

12. Polypropylene according to claim 11, wherein the ethylene-propylene rubber (EPR) has an ethylene content of up to 50 wt %.

13. Polypropylene according to claim 1, wherein the polypropylene is a propylene copolymer comprising a polypropylene matrix and up to 70 wt % of an ethylene-propylene rubber (EPR).

14. Polypropylene according to claim 1, wherein the catalyst system has a porosity of less than 1.40 ml/g, as determined according to DIN 66135.

15. Polypropylene according to claim 14, wherein the asymmetric catalyst is dimethylsilandiyl [(2-methyl-(4'-tert-butyl)-4-phenyl-indenyl)(2-isopropyl-(4'tert-butyl)-4-phenyl-indenyl)] zirconium dichloride.

* * * * *